(12) United States Patent
Verhoef

(10) Patent No.: US 6,543,336 B2
(45) Date of Patent: Apr. 8, 2003

(54) DEVICE FOR BREWING BEVERAGES

(75) Inventor: Kees Verhoef, Sliedrecht (NL)

(73) Assignee: Veromatic International B.V. (NL)

( * ) Notice: Subject to any disclaimer, the term of this patent is extended or adjusted under 35 U.S.C. 154(b) by 0 days.

(21) Appl. No.: 09/934,309

(22) Filed: Aug. 21, 2001

(65) Prior Publication Data

US 2002/0020301 A1 Feb. 21, 2002

(30) Foreign Application Priority Data

Aug. 21, 2000 (NL) .............................................. 1015974

(51) Int. Cl.$^7$ ................................................. A47J 31/36
(52) U.S. Cl. ...................... 99/289 R; 99/280; 99/289 T
(58) Field of Search ........................... 99/289 T, 289 R, 99/280, 281, 282, 283, 279

(56) References Cited

U.S. PATENT DOCUMENTS

| | | | | |
|---|---|---|---|---|
| 4,506,596 A | * | 3/1985 | Shigenobu et al. ....... | 99/289 T |
| 5,349,897 A | * | 9/1994 | King et al. ............... | 99/289 R |
| 5,642,655 A | | 7/1997 | King ....................... | 99/289 T |

FOREIGN PATENT DOCUMENTS

| | | |
|---|---|---|
| GB | 871324 | 6/1961 |
| GB | 1156872 | 7/1969 |
| GB | 2165741 | 4/1986 |
| GB | 2250426 | 6/1992 |

* cited by examiner

*Primary Examiner*—Reginald L. Alexander
(74) *Attorney, Agent, or Firm*—Ostrolenk, Faber, Gerb & Soffen, LLP

(57) ABSTRACT

A device for brewing beverages, in particular hot beverages, such as coffee and tea, comprises a filter unit, a brewing housing which interacts with the filter unit, can move up and down with respect to the filter unit and has an at least partially open base, a collection chamber which is in communication with the filter unit and has a closable outlet for discharging the prepared beverage, feeder for feeding starting materials for the beverage which is to be prepared and water to the brewing housing, and a control device for controlling the various components and functions of the device in a coordinated manner. According to the invention, the control device is designed in such a manner that the brewing housing can make a stroke downwards in order to clear the residue from the brewing housing.

8 Claims, 4 Drawing Sheets

DEVICE FOR BREWING BEVERAGES

FIELD OF THE INVENTION

The invention relates to a device for brewing beverages, in particular hot beverages, such as coffee and tea, which device comprises a filter unit, a brewing housing which interacts with the filter unit, can move up and down with respect to the filter unit and has an at least partially open base, a collection chamber which is in communication with the filter unit and has a closable outlet for discharging the prepared beverage, feed means for feeding starting materials for the beverage which is to be prepared and water to the brewing housing, and a control device for controlling the various components and functions of the device in a coordinated manner.

BACKGROUND OF THE INVENTION

A device of this type, in particular in the form of a vending machine, is known in the art. The known device comprises a brewing housing (also known as an extraction chamber) with an at least partially open base, which is arranged above a collection chamber. A filter unit, in particular comprising a displaceable filter in strip form, is positioned between the brewing housing and the collection chamber. The collection chamber comprises a hollow cylinder with an outlet in its wall. A plunger is arranged moveably in the collection chamber.

To brew coffee, a metered quantity of ground coffee is deposited on the filter in the brewing housing, and hot water is then supplied. The plunger is moved upwards out of a bottom limit position in the collection chamber, so that air which is situated in the collection chamber is blown through the filter into the mixture of coffee and hot water, which has a beneficial effect on the extraction process and therefore on the quality of the coffee. After the desired extraction time has elapsed, the direction of movement of the plunger is reversed, so that the coffee is sucked out of the brewing housing through the filter into the collection chamber, and after the outlet has been opened, for example as a result of the plunger being displaced to below the outlet opening in the cylinder wall of the collection chamber, the coffee can flow out into a designated container, such as a cup or thermos flask. The brewing housing is then lifted off the filter, and the used part of the filter, together with the remaining coffee grounds, is discharged to a suitable waste receptacle. To prevent coffee residues from adhering to the wall of the brewing housing and thus having an adverse effect on the quality of the next beverage which is prepared, and also to prevent coffee residues from working their way through the machine, which could affect its correct operation and require cleaning work, the brewing housing is ejected from the filter unit using a sudden, powerful upward movement (also known as an "upward click"), in order to clear the coffee grounds off the wall of the brewing housing so that they drop onto the filter before the filter is conveyed onwards.

However, it has been found that the residue, such as coffee grounds or tea leaves, though it detaches from the wall of the brewing housing as a result of the sudden upward movement, does not completely deposit onto the filter, and consequently the full desired effect is not obtained. The residue spreads undesirably through the device, such as between the top edge of the brewing housing and a feed funnel arranged above it for supplying raw materials, between the filter and the brewing housing, and even throughout the entire device. Such a spreading is undesirable from hygiene and fault aspects.

SUMMARY OF THE INVENTION

It is an object of the present invention to provide a device for brewing beverages in which the abovementioned drawbacks are eliminated altogether or occur to a greatly reduced extent.

The device of the type mentioned above, according to the invention, is for this purpose characterized in that the control device is designed in such a manner that the brewing housing can make a stroke downwards in order to clear the residue from the brewing housing.

Unlike in the known device, in the device according to the invention the brewing housing executes a downwardly directed, sudden movement (a so-called "downward click"), so that consequently the residue is also knocked off in the direction of the filter itself. This reduces the spread of the residue through the device, which is of benefit with regard to hygiene, maintenance and susceptibility to faults. This downward click is carried out after the extract has been sucked out of the brewing housing and before the filter is conveyed onwards or, in the case of a fixed filter, cleaned with the aid of a scraper or the like. Only the brewing housing moves when the downward click is being carried out with respect to the filter unit.

BRIEF DESCRIPTION OF THE DRAWINGS

The invention will now be explained with reference to the appended drawing, in which.

DESCRIPTION OF THE PREFERRED EMBODIMENTS

Figure 1:
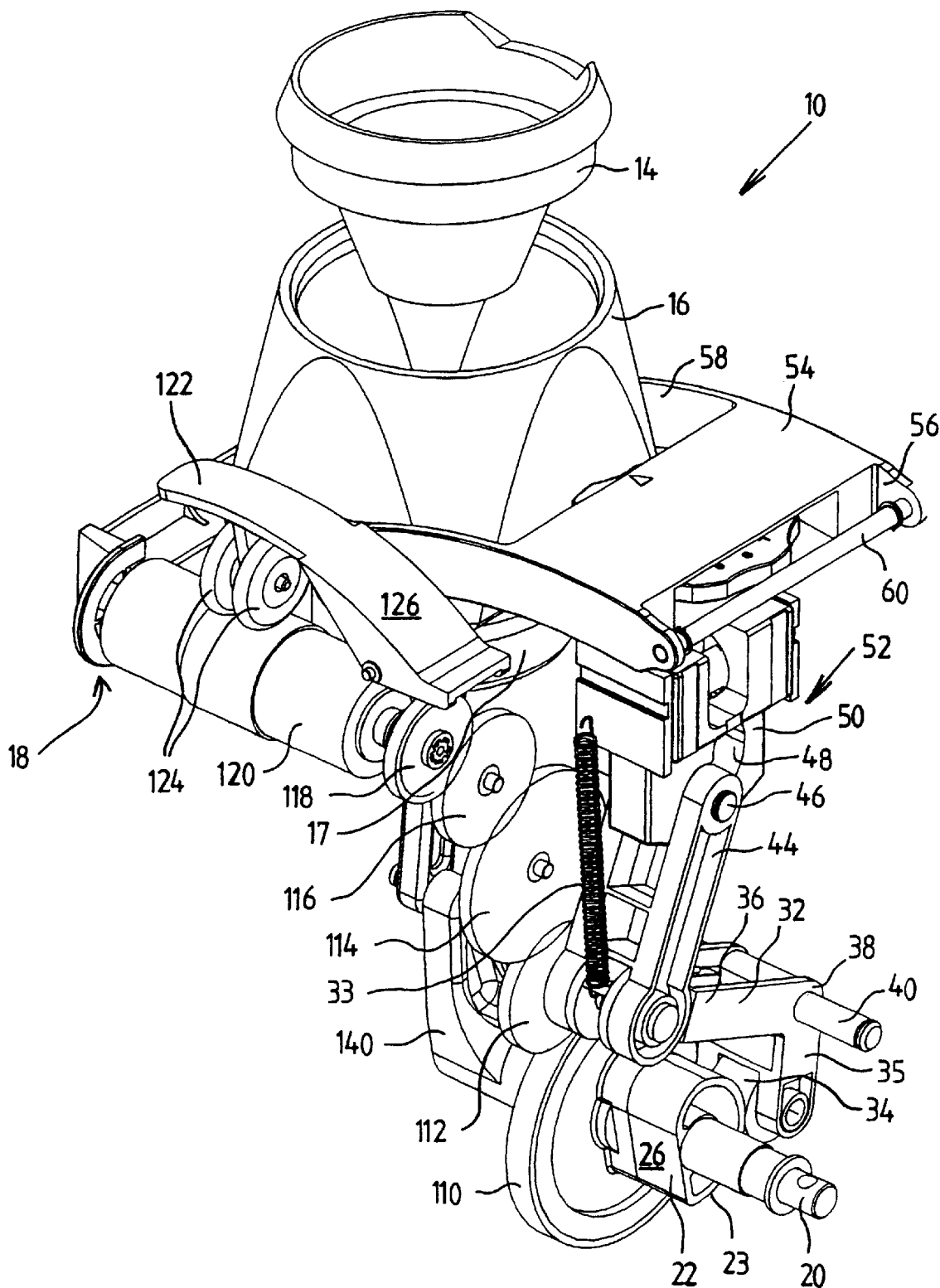
FIG. 1 shows a perspective view of one embodiment of a device according to the invention.
Figure 2:
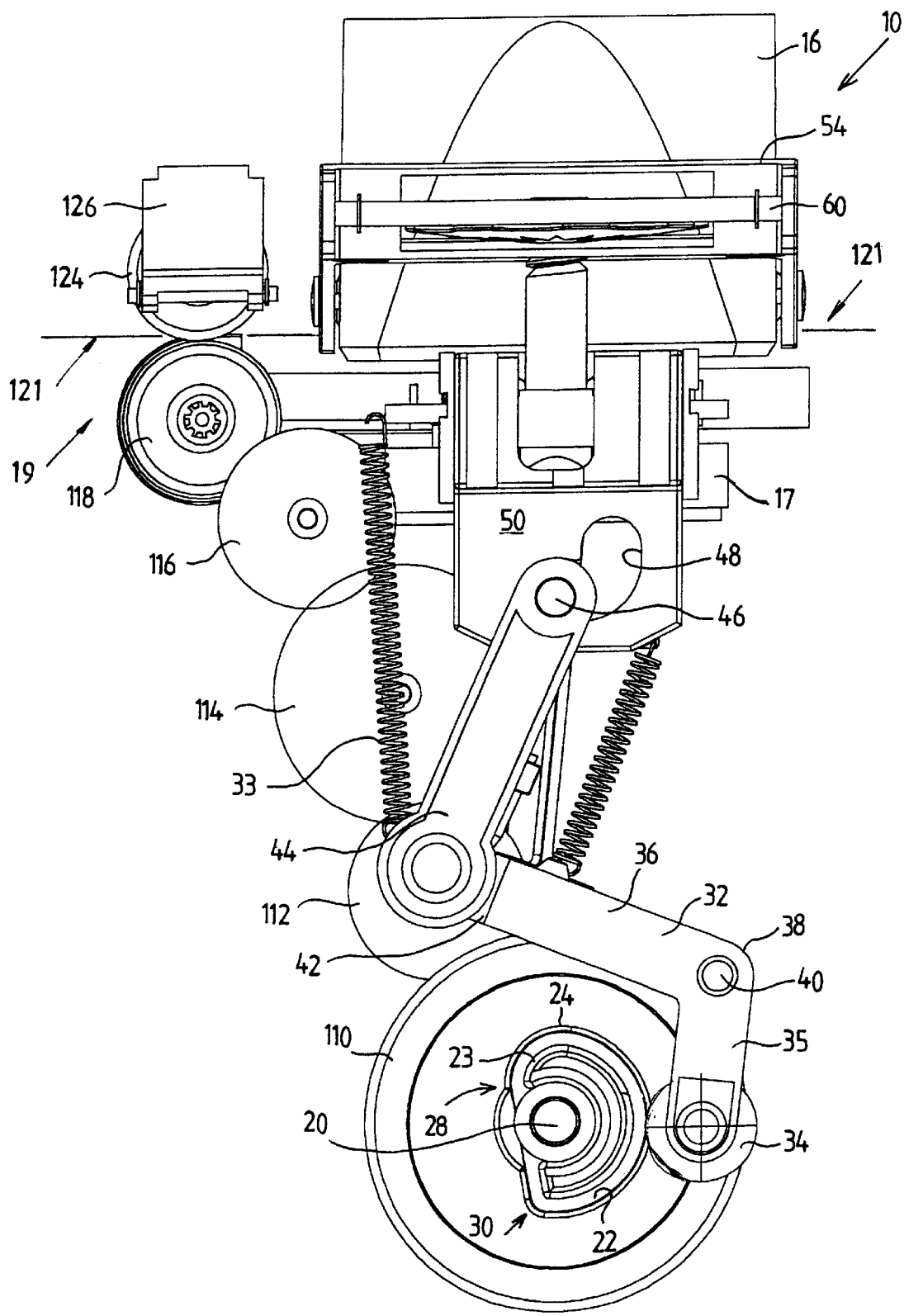
FIG. 2 shows a simplified rear view of the embodiment shown in FIG. 1.

Advantageously, the control device comprises a driven shaft, for example the output shaft of an electric motor, which is connected, via a system of cams, to a lifting arm which at one end is arranged so that it can pivot about a horizontal pin and at the other end bears the brewing housing.

Preferably, the system of cams comprises a first cam, which is rigidly connected to the driven shaft and which comprises a first cam body, the outer periphery of which is of a suitable shape for executing the movements of the brewing housing, and a first cam follower which is in contact with the outer periphery of the first cam. The first cam follower is kept in constant contact with the outer periphery of the first cam body, for example using a spring structure.

Advantageously, the system of cams comprises a second cam, which is rigidly connected to the lifting arm, can move vertically and comprises a cam body in which there is an elbow-shaped cam track, the elbow-shaped cam track comprising a vertical section which, at the bottom, merges into a horizontal section in which a second cam follower is arranged. The first cam follower may be pivotably connected to the second cam follower with the aid of a suitable linkage system.

More particularly, the first cam follower is attached, in a freely rotatable manner, to one end of a lever which comprises two lever arms which are at a fixed obtuse angle and the corner of which is pivotably attached to a fixed position in the housing of the device. One end of a rod is pivotably connected to the other end of the lever, and the other end of the said rod comprises the second cam follower, which is in contact with the second cam, which can be moved up and down. This cam is rigidly connected to the lifting arm which bears the brewing housing at one end. The lever and rod are pressed apart with the aid of a wire or leaf spring.

The first and second cams are designed in such a manner that at the end of the extraction process, when the beverage has been sucked out of the brewing housing with the aid of the plunger arranged in the collection chamber, the brewing housing executes a gradual (relatively slow) movement upwards away from the filter, and then makes a sudden (relatively quick) stroke towards the filter. Subsequently, the brewing housing moves upwards again, so that the filter in strip form together with residue can then be conveyed onwards.

Usually, the shaft (of the electric motor) also drives the plunger arranged in the collection chamber, for example via a suitable linkage system.

Other problems which arise with many vending machines of conventional design, such as coffee brewers, with a displaceable filter material in strip form are related to the transport of this filter material in strip form. In a conventional coffee brewer, the filter material in strip form is guided over a wide, continuously driven filter transport reel, which is arranged beneath and in contact with the filter material. Furthermore, freely rotatable counterpressure rollers are arranged on an arm above the filter material at both longitudinal edges thereof, which counterpressure rollers are only brought into contact with the filter material in strip form when the latter is to be conveyed onwards. Otherwise, the filter material would tear across. The continuous rotation of the filter transport reel leads to some waste of energy. Furthermore, it has been found that in some coffee brewers the onward transport of used filter material with residue begins before the brewing housing has reached its uppermost limit position, and consequently the top layer of the residue is retained by the bottom edge of the brewing housing and drops onto the newly supplied filter material. The result is an accumulation of residue, which has an adverse effect on the quality of the beverage. In addition, the design of the arm with counterpressure rollers is such that it sometimes adopts a skew position or is bent with respect to the filter material, with the result that one of the counterpressure rollers is pressed to a greater or lesser extent, or sooner or later, onto the transport reel, so that the filter material is transported crookedly, with all the resulting adverse effects, such as contamination, increased risk of the filter material breaking and other faults.

Therefore, according to a preferred embodiment of the device according to the invention, if the filter unit comprises a displaceable filter material in strip form, the filter transport reel is driven discontinuously, in other words the device is provided with means for the discontinuous transportation of filter material in strip form. These means preferably comprise a driven shaft, more preferably the same shaft as that which is used to drive the movement of the brewing housing, to which a partially toothed wheel is attached, which, via a toothed gearing, drives a filter transport reel discontinuously. This toothed gearing comprises one or more ordinary toothed wheels. On account of the partially toothed wheel, only part of the rotation of the driven shaft is transmitted to the filter transport reel. A counterpressure member for exerting pressure on the filter material in strip form is arranged in the centre of and opposite the filter transport reel. A counterpressure member of this type may comprise one or more wheels which can rotate freely and are attached to one end of a clamping arm which can pivot about an axis.

Since the filter transport reel is driven discontinuously, a counterpressure wheel can be in continuous contact with the filter material, for example under a certain pressure with the aid of a clamping arm (a lifting structure for lifting the wheels is therefore superfluous); the centred position of the counterpressure member also prevents the accumulation of residue and the filter material in strip form from being pulled out of position.

This discontinuous drive can also be used in other coffee brewers without a "downward click", such as a device for brewing beverages, in particular hot beverages, such as coffee and tea, which device comprises a filter unit, comprising filter material in strip form, a brewing housing which interacts with the filter unit and can move up and down with respect to the filter unit and has an at least partially open base, a collection chamber which is in communication with the filter unit and has a closable outlet for discharging the prepared beverage, a feeder for feeding starting materials for the beverage which is to be prepared and water to the extract chamber, a control device for controlling the filter unit, the brewing housing, the collection chamber and the feeder, and a discontinuous drive for discontinuously driving the transport of filter material in strip form.

Figure 3:
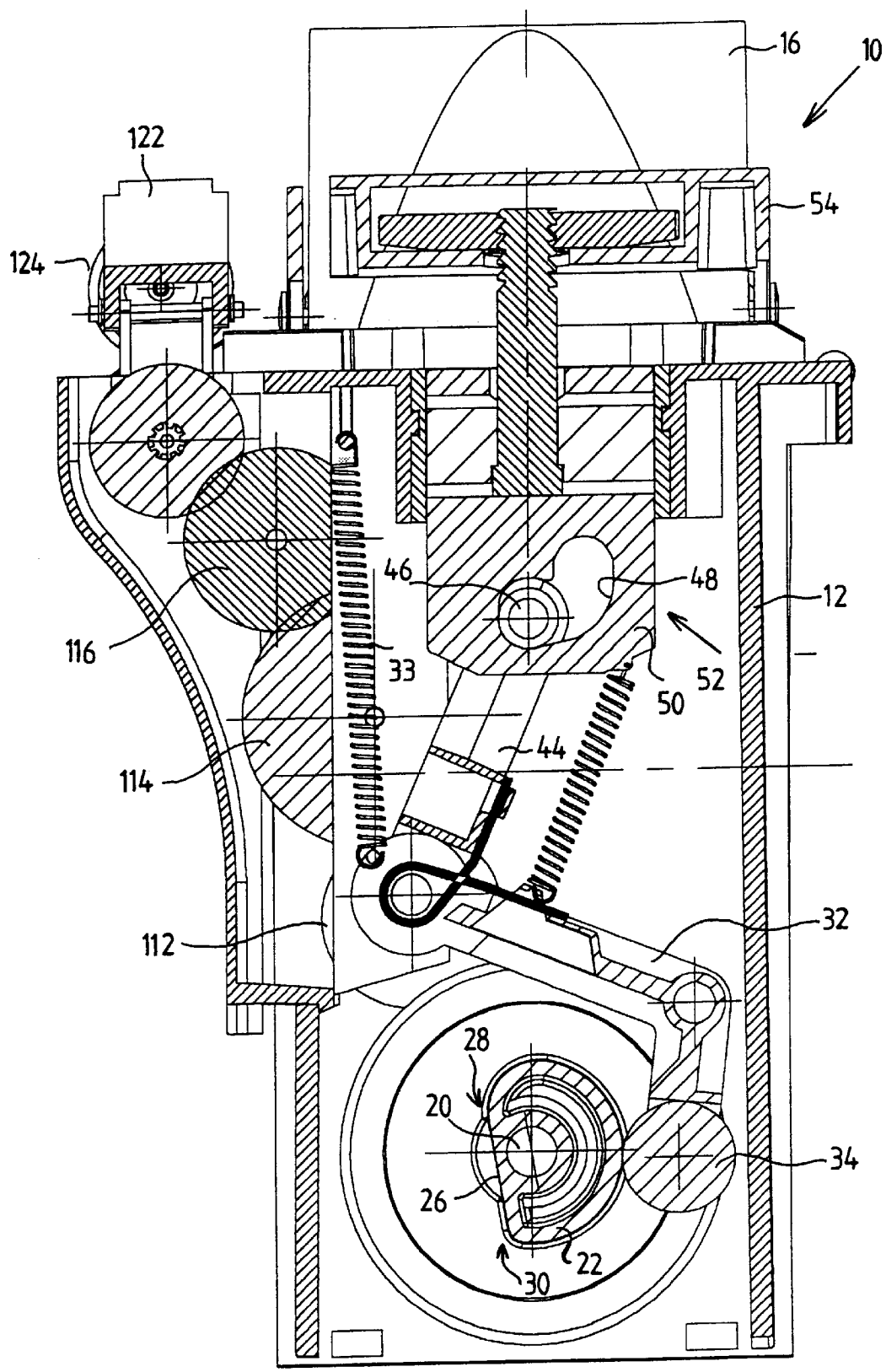
FIG. 3 shows a cross section through the embodiment shown in FIG. 1.

The attached figures show an embodiment of a device for brewing beverages, such as a coffee brewer for a vending machine, which is denoted overall by reference number 10. This device comprises a frame 12 (cf. FIG. 3), which shields most moving parts of the device. A funnel 14 for supplying metered quantities of starting material, ground coffee and hot water, is arranged above a brewing housing 16 with an at least partially open upper side and an at least partially open base, in which the extraction process is carried out. Beneath the brewing housing 16 there is a collection chamber 17, comprising a cylinder in which there is a vertically moveable plunger (not shown). During use, a filter material in strip form, for example a paper filter strip 121, is positioned horizontally between the brewing housing 16 and the collection chamber 17; this filter strip can be displaced using a transport device 18. The paper filter strip 121, the transport device 18l, and other elements which will be discussed in more detail below, are comprised in a filter unit 19.

Furthermore, the device is provided with (electronically controlled) metering means for feeding a predetermined quantity of coffee and a predetermined quantity of hot water to the brewing housing 16 via the funnel 14. A control device for controlling the various components and functions in a coordinated manner, in the embodiment illustrated, comprises a driven shaft 20, for example of an electric motor arranged outside the frame 12, to which a first cam 22 is rigidly attached for the purpose of actuating the movements of the brewing housing 16. For this purpose, the first cam 22 comprises a first cam body 23 with an outer periphery 24 (external cam track), the shape of which is adapted to the movements which are to be carried out by the brewing housing. In the embodiment illustrated, the cam body 23 has a curved periphery 24 with a flattened side 26 which at one end 28 has a relatively gradual transition and at the other end 30 a relatively sharp transition, the function of which will be explained in more detail below. A first cam follower 34 which is mounted so that it can rotate freely in an end of a bent lever 32 is held in constant contact with the first cam 22 with the aid of a long tension spring 33. The bent lever 32 comprises two lever arms 35 and 36 which are at an obtuse angle with respect to one another and the corner 38 of which is attached to a pivot pin 40 which is supported by the frame 12. The end 42 of lever arm 36 is pivotably connected to an end of an intermediate rod 44, the other end of which functions as a pivot and second cam follower 46 by interacting with an elbow-shaped cam track 48, which is provided in a cam body 50 of a second cam 52 which can move vertically up and down. This second cam 52 is rigidly attached to a lifting arm 54 at a position between a hinge end 56 and a free end 58, which bears the brewing housing 16. The hinge end 56 of the lifting arm 54 is connected to the frame 12 via a horizontal pivot pin 60.

Figure 4:
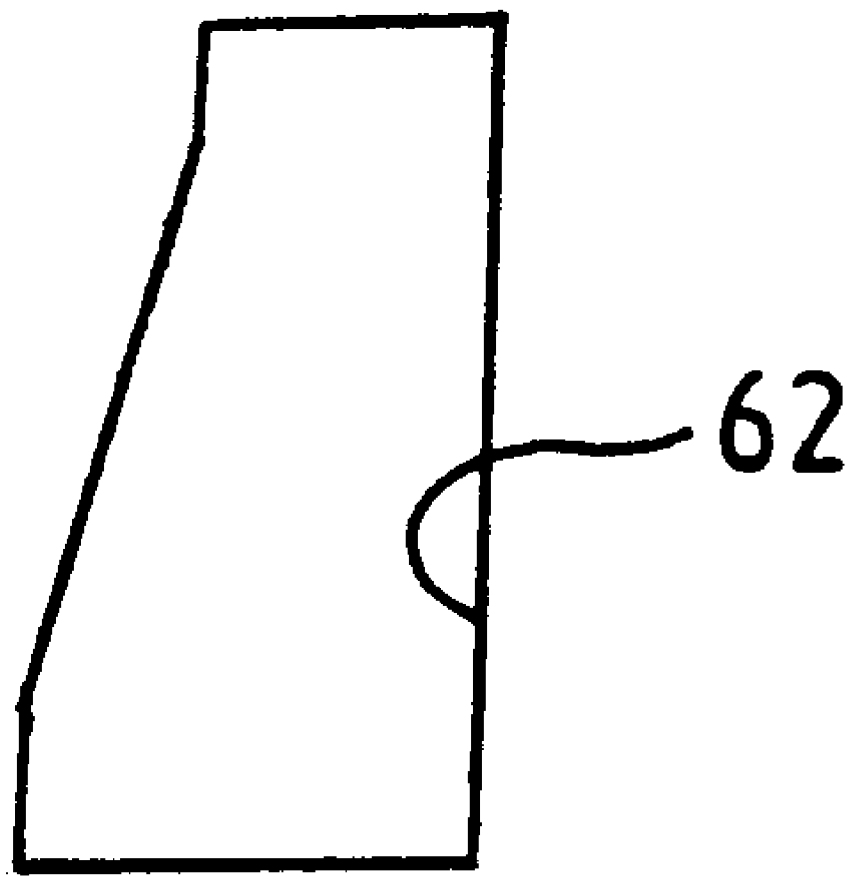
FIG. 4 shows a detailed view of a cam of the drive structure of the brewing housing.

This drive mechanism functions as follows: when the shaft 20 rotates counter-clockwise, assuming that the first cam follower 34 touches the first cam 22 in the curved section just beyond the gradual transition 28, the first cam 22 also rotates counter-clockwise, with the result that, via the first cam follower 34, the lever 32 rotates slightly to the right, under the influence of the tension spring 33, with the result that the intermediate rod 44 is pushed upwards and in turn pushes the second cam 52 and therefore the lifting arm 54 with brewing housing 16 upwards. The second cam follower 46 is forced to the right in the situation illustrated by a third cam 62 (cf. FIG. 4), which is arranged behind the second cam 52 and cannot move vertically, until the second cam 52 enters the vertical section of the elbow-shaped cam track 48 and the second cam 52 suddenly shoots downwards, and therefore the lifting arm 54 with brewing housing 16 also shoots downwards, thus effecting the downward click. When the shaft 20 rotates onwards, the intermediate rod 44, lifting arm 54 and brewing housing 16 will move upwards again, so that sufficient space is formed between brewing housing 16 and collection chamber 17 for the used filter material together with coffee grounds to be transported onwards to a waste receptacle (not shown). As the shaft 20 rotates further, the rod 44, second cam 52, lifting arm 54 and brewing housing 16 are lowered back down to the starting position and the device is ready for the next preparation cycle.

A section of the actuator for the plunger in the collection chamber 17, which is denoted overall by reference numeral 140 and is attached to the end of the shaft 20, is also illustrated in FIG. 1.

What is claimed is:

1. Device for brewing beverages, in particular hot beverages, such as coffee and tea, which device comprises a filter unit, a brewing housing which interacts with the filter unit and can move up and down with respect to the filter unit and has an at least partially open base, a collection chamber which is in communication with the filter unit for collecting and discharging the prepared beverage, a feeder for feeding starting materials for the beverage which is to be prepared and water to the brewing housing, and a control device for controlling the filter unit, the brewing housing, the collection chamber and the feeder wherein the control device controls the brewing housing to make a sudden downward stroke which clears the residue from the brewing housing.

2. Device according to claim 1, wherein the control device comprises a driven shaft which is connected, via a system of cams, to a lifting arm which at one end is arranged so that it can pivot about a horizontal pin and at the other end bears the brewing housing.

3. Device according to claim 2, wherein the system of cams comprises a first cam, which is rigidly connected to the driven shaft and which comprises a first cam body, the outer periphery of which is of a suitable shape for executing the sudden downward stroke of the brewing housing, and a first cam follower which is in contact with the outer periphery of the first cam.

4. Device according to claim 2, wherein the system of cams comprises a second cam, which is rigidly connected to the lifting arm, can move vertically and comprises a cam body in which there is an elbow-shaped cam track, the elbow-shaped cam track comprising a vertical section which, at the bottom, transforms into a horizontal section in which a second cam follower is arranged displaceably.

5. Device according to claim 1, wherein the device comprises a discontinuous drive for discontinuously driving the transport of filter material in strip form.

6. Device according to claim 5, wherein the discontinuous drive comprises a partially toothed wheel which is attached to a driven shaft and, via a toothed gearing, discontinuously drives a filter transport reel.

7. Device according to claim 1, wherein a counterpressure member for exerting pressure on the filter material in strip form is arranged in the centre of and opposite to a filter transport reel.

8. Device according to claim 7, wherein the counterpressure member comprises one or more wheels which can rotate freely and are attached to one end of a clamping arm which can pivot about an axis.

\* \* \* \* \*